Dec. 30, 1941.    C. H. DIX    2,267,858
METHOD OF SEISMIC SURVEYING
Filed Sept. 8, 1941    2 Sheets-Sheet 1

CHARLES HEWITT DIX
INVENTOR
ATTORNEY

Dec. 30, 1941.  C. H. DIX  2,267,858
METHOD OF SEISMIC SURVEYING
Filed Sept. 8, 1941  2 Sheets-Sheet 2

CHARLES HEWITT DIX
INVENTOR

ATTORNEY

Patented Dec. 30, 1941

2,267,858

UNITED STATES PATENT OFFICE 2,267,858

METHOD OF SEISMIC SURVEYING

Charles Hewitt Dix, Pasadena, Calif., assignor to Socony-Vacuum Oil Company, Incorporated, New York, N. Y., a corporation of New York Application September 8, 1941, Serial No. 410,113

2 Claims. (Cl. 181—0.5)

This invention relates to geophysical prospecting and more particularly to a refraction profile method of seismic surveying.

In recent years the refraction method of seismic geophysical investigation has fallen into disfavor because of the high cost of practicing it. But the reflection methods which have largely replaced it are not wholly satisfactory; it is often difficult or impossible to select the significant reflection from among the many disturbances which appear on the seismograph records, and, when the geological interface to be investigated is not perfectly sharp and definite, useful reflections are frequently unobtainable.

It is, therefore, an object of my invention to reduce the cost of refraction profile methods of seismic surveying.

More specifically, it is an object of my invention to eliminate the necessity of running tests over the same ground in both directions in order to obtain "reversed profile" data.

A further object of my invention is to increase the completeness and continuity of refraction profile data obtainable at reasonable cost.

Other objects and advantages of my invention will become apparent from the following detailed description, when considered with the accompanying drawings in which.

Figure 1:
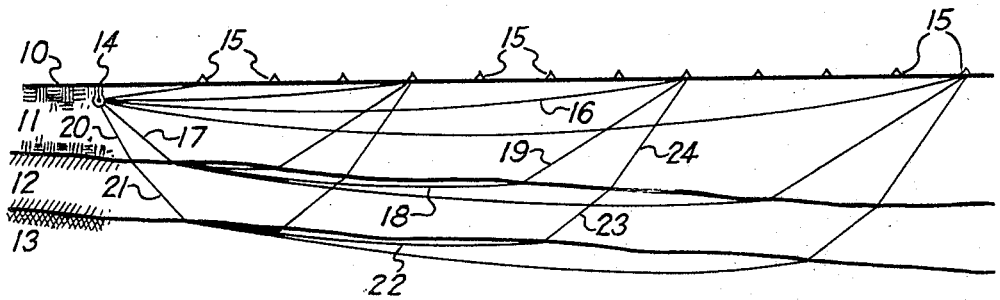
Fig. 1 illustrates a fragmentary section of the earth's surface showing a plurality of substrata and the location of a shot point as well as the detecting stations along the surface.
Figure 2:
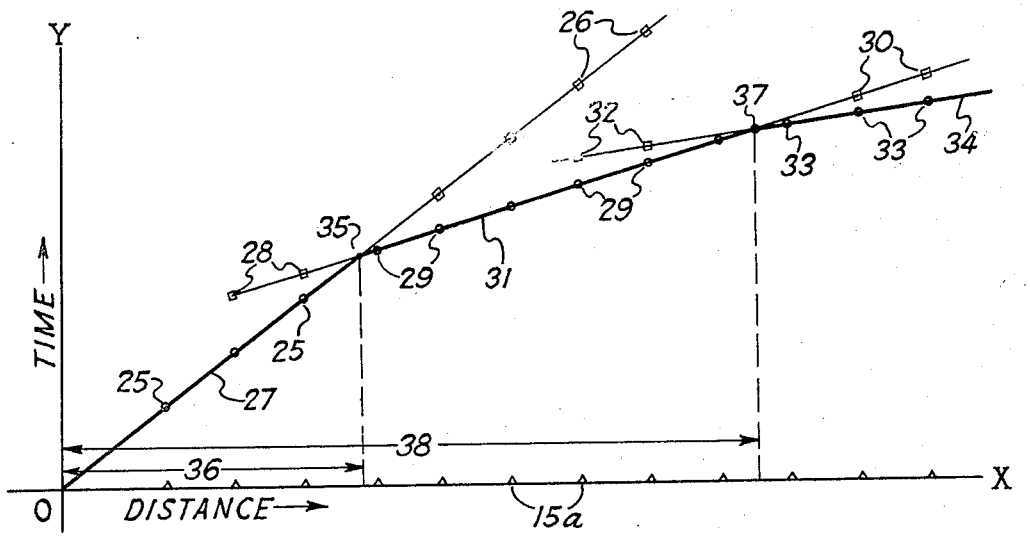
Fig. 2 is a chart plotted from data such as might be obtained at the detecting stations shown in Fig. 1.

Referring to Figs. 1 and 2, I will first briefly review the refraction profile method as generally practiced heretofore, in order that my invention may be more readily understood. Fig. 1 illustrates in section the surface of the earth 10 and a series of layers 11, 12, and 13, each layer having an average seismic wave velocity distinctly greater than that of the layer next above. The shot point is shown at 14, and a series of recording seismometers, all lying on a substantially straight line on the surface, is indicated at 15—15. The seismometers are customarily spaced at equal intervals, for example 250 meters apart. A heavy charge of dynamite or the like is buried at 14 and exploded by an electric cap, and it is arranged that the fusing of the resistance wire in the cap actuates an electrical impulse which is transmitted, by either radio or wire, to the various seismometer stations. Thus a record of the instant of the explosion is obtained at each station.

The seismic pulse generated by the explosion may be regarded as travelling along various ray paths, a few of which are indicated in Fig. 1. It will be noted that the rays are shown as slightly curved; this is because of the usual tendency of seismic velocity to increase continuously with increasing depth within each layer, which produces the effect of curved paths by refraction. Ray 16 is an example of a ray of the so-called "direct pulse," i. e., of the pulse which travels entirely in the first layer, 11. Another ray path is illustrated at 17—18—19; in this path, partial ray 17 meets stratum 12 at such an angle that it is refracted along path 18, which passes through stratum 12 substantially parallel to its upper boundary. Upon emerging into upper layer 11, the ray is again refracted and passes along 19 until it reaches the surface. Still another type of ray path is represented at 20—21—22—23—24. In this path, the ray penetrates both layers 11 and 12 and travels just below the upper boundary of layer 13, as shown by partial ray 22. The ray paths which lie in part in the deeper layers represent the paths of the "refracted pulses" which are the particular objects of study in the art of refraction seismometry.

The nature of the data obtained by recording seismometers 15—15 is illustrated in Fig. 2. This figure is a chart in ordinary Cartesian coordinates, in which the abscissae represent distances from the shot point 14 along the line of survey and the ordinates represent time elapsed after the instant of the explosion. The locations of the seismometer stations are indicated by the small triangles 15a along the X axis, and the plotted points represent the records of seismic pulses obtained at these stations.

The records of the direct pulses, which travel through layer 11 only, are plotted as points 25—25 and 26—26. These points lie upon a substantially straight line 27 which passes through the origin. Points 28, 29—29, and 30 represent the records of the travel time of the pulse which penetrates into, but no deeper than, the second layer 12. These points lie on a more or less straight line 31, whose irregularities reflect irregularities of the profile of the interface between layers 11 and 12. Points 32 and 33—33 correspond to the arrivals of the pulse which penetrates into the third layer, 13, and they lie upon still another line, 34.

Points 25—25, 29—29, and 33—33, which are indicated by small circles, are referred to as "primaries," since these represent the first vibrations recorded by the seismometers. The other points, which are represented by small squares, are called "secondaries." Good records of the secondary points are not always obtainable because of the after-vibrations caused by the primary pulse, but whenever the secondaries give reliable times these can be used in the same way as the primaries are used. The following discussion refers principally to primaries, but it is intended to cover readable secondaries as well, since there is no essential difference between secondaries and primaries except for the order of their arrival.

It may readily be seen that the slope of line 27 is the reciprocal of the average velocity of a seismic pulse through upper earth layer 11. Similarly, the slope of line 31 is in part a reciprocal function of the velocity of a seismic pulse through second layer 12. But the slope of line 31 is also a function of the inclination of the interface between layers 11 and 12, as may be seen by referring to Fig. 1. It will be noted that, proceeding to the right from the shot point, as upper layer 11 becomes thicker, the length of partial ray 19 through the slower medium becomes longer. Therefore the slope of line 31 is a little steeper than it would be if upper layer 11 were of uniform thickness. If layer 11 were progressively thinner in the direction of the survey, the opposite would be true.

Since the slope of line 31 is a function of two mutually independent unknowns, the velocity of siesmic pulses through layer 12 and the inclination of the upper boundary of layer 12, the data represented in Fig. 2 are insufficient as a basis for deductions concerning subsurface profiles. This difficulty has heretofore been met by running a similar test over the same surveyed line, in the opposite direction, obtaining what is known as a "reversed profile." A line analogous to line 31 may be plotted from the reversal data. The slope of this new line will be a function of the same seismic velocity and the opposite inclination of interface as the slope of line 31; therefore, the "apparent velocities" as deduced from line 31 and its reversed counterpart may be averaged to obtain the true velocity of siesmic pulses through layer 12, and the difference between the apparent velocities is a measure of the inclination of the interface between layers 11 and 12.

In Fig. 2, point 35 at the intersection of lines 27 and 31 is referred to as the "critical point" and its abscissa 36 is referred to as the "critical distance." The critical distance in many cases is the shortest distance at which useful records of refracted pulses may be obtained, and it is also (when interpreted in view of the velocities of siesmic pulses through layers 11 and 12) an indication of the thickness af layer 11. Point 37, at the intersection of lines 31 and 34, is known as the "second critical point" and its abscissa 38 is called the "second critical distance." This second critical distance marks the greatest distance at which seismometer records useful for plotting line 31, and therefore useful for indicating the profile of the interface between layers 11 and 12, may ordinarily be obtained.

Although the primary points 33—33 obtained at seismometer stations more distant than the second critical distance are very useful for indicating the nature of the interface between layers 12 and 13, they are not useful for indicating the nature of the interface between layers 11 and 12, which alone is considered in the following discussion. For this reason, when terms such as "the most distant useful seismometer station" are used in the following description and in the appended claims, they will be understood as referring to the last seismometer station which yields a readable point on the line characteristic of the interface particularly being studied, whether or not this station is the most distant actually set up.

It will be understood that there are various refinements, such as the allowance for the increase of seismic velocity with depth within a single layer, which are not described herein. These refinements, which are known to those skilled in the art, are of considerable importance in actual practice, but they are not necessary to an understanding of the present invention.

Figure 3:
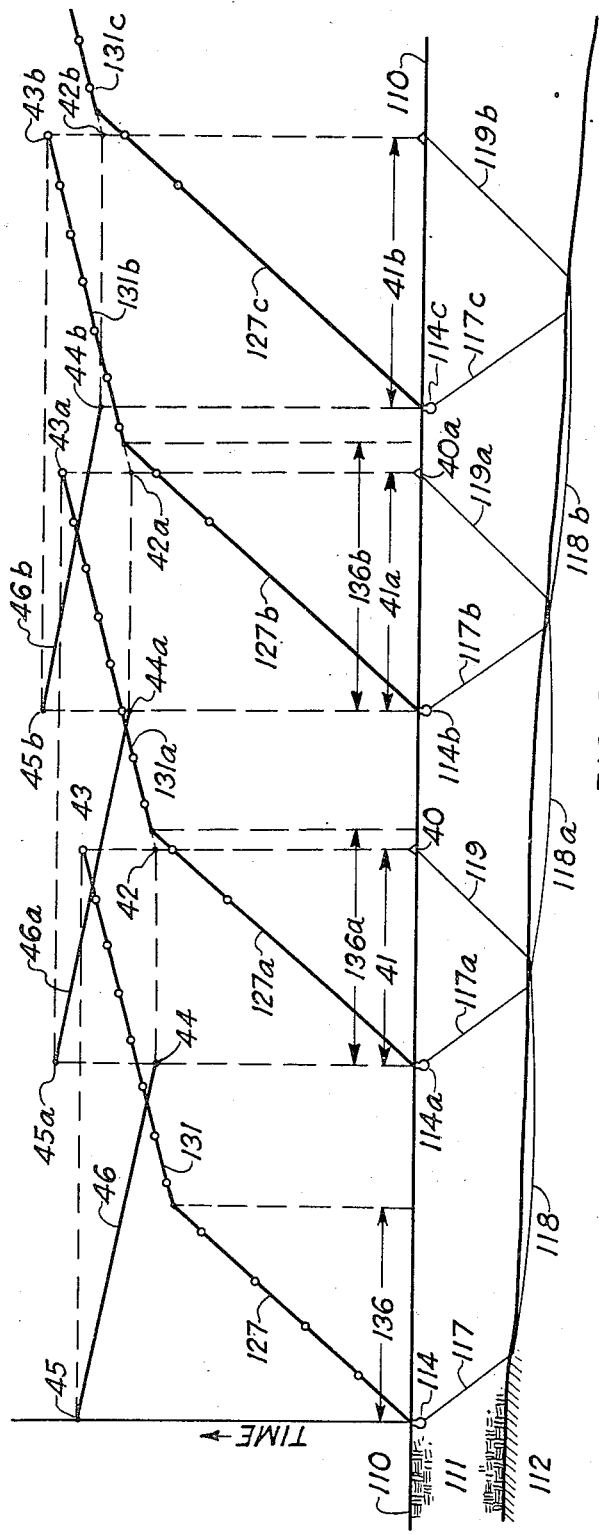
Fig. 3 is a diagram illustrating the practice of the present invention, in which diagram a sectional representation of the earth's surface and a chart of plotted data are combined.

Referring now to Fig. 3, which illustrates my invention, the line 110 represents the surface of the earth. The portion of the figure below this line is a sectional diagram like Fig. 1, in which the two earth layers 111 and 112 are shown, together with certain ray paths of seismic pulses. The portion of the figure above line 110 is a chart of the same general nature as Fig. 2. As in Fig. 2, observed primary points are represented by small circles. The survey illustrated in Fig. 3 is an example of the type (which seemes to be the more usual) in which conditions are such that no useful points other than the primaries are obtainable.

My method begins in precisely the same manner as the heretofore-known method reviewed above. A charge of explosive is detonated at shot point 14, and the seismometer records of the pulse thereby created are plotted to form lines 127 and 131, which are exact counterparts of lines 27 and 31, respectively, shown in Fig. 2. But I do not run another test in the opposite direction over the same ground, since I have devised a better method of obtaining information sufficient for resolving the indeterminateness of the results yielded by the first explosion.

I have indicated at 40 the position of the "useful seismometer station" which is most distant from shot point 114. From this position I measure back toward shot point 114 a distance 41, which distance is (preferably) about equal to critical distance 136 or (permissibly) somewhat greater than the critical distance. When such secondary points as are illustrated at 28 in Fig. 2 are readable, distance 41 is taken as equal to the distance from the shot point to the seismometer station yielding the nearest of such points, or, if desired, a somewhat greater distance. In the appended claims, the minimum for distance 41, as here defined, is referred to as the distance from the shot point to the "nearest useful seismometer station," although it is to be understood that stations too near to yield readable points on line 131 are useful for indicating the characteristics of the uppermost layer 111. Measuring out distance 41 determines point 114a, which is the location of the second shot point. A second test is run from point 114a in the same manner and in the same direction, yielding a second pair of lines 127a and 131a, analogous to lines 127 and 131 respectively. The location of point 42, which represents the intersection of line 131a with the vertical erected at 40, is then determined. The determination of point 42 may in some cases (as in the example illustrated) involve a slight extrapolation; in other cases it may be arrived at by interpolation or may be read directly from the appropriate seismometer record. The ordinate of point 42 is the time required for a refracted seismic pulse to travel along the ray path 117a—119, in either direction.

Furthermore, the ordinate of the last useful primary point, 43, is the time required for a seismic pulse to travel, in either direction, along the ray path 117—118—119. Therefore, if point 42 is projected back to the vertical erected at 114a, and if point 43 is projected back to the vertical erected at point 114, a new pair of points 44 and 45 is obtained, which determines a new line 46. Line 46 is precisely the same "reversed profile" line which would be obtained by firing a charge of explosive at point 40 and detecting the pulse by seismometers located at points 114 and 114a if the operators were fortunate enough to find points 44 and 45 to be primaries or readable secondaries. As above indicated, the slope of line 46 is sufficient to resolve the indeterminateness of the information plotted as line 131.

Similarly, from the next "last useful seismometer station," 40a, a distance 41a equal to (or slightly greater than) critical distance 136a is measured back, and another shot point, 114b, is thereby located. The operations are thus repeated, as indicated by analogy of reference numerals, for the entire length of the profile which it is desired to survey.

Figure 4:
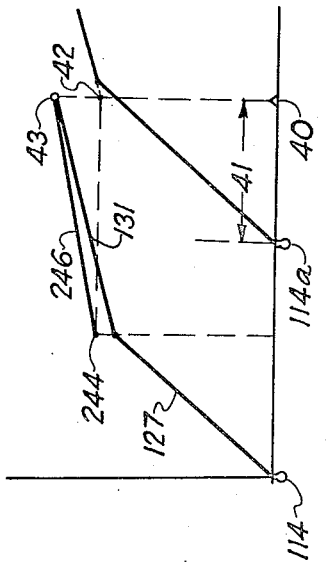
Fig. 4 is a chart illustrating an alternative method of plotting the data obtainable by my method.

It will be understood that the particular geometric method of plotting deduced "reversed profile" data shown in Fig. 3 is merely exemplary; I have chosen it in order to illustrate more clearly the relation between my method and the method used heretofore, in which "reversal data" were obtained by an actual reversed run. An alternative method of plotting results is indicated in Fig. 4. In this method, point 42 is found as shown in Fig. 3, but points 42 and 43 are not projected in the same manner. Instead, a new point 244 is constructed, having the same ordinate as point 42 and an abscissa equal to distance 41. A line 246 is then drawn between points 43 and 244. Line 246 expresses the same information as line 46 of Fig. 3, and its position makes it somewhat preferable for quick mental interpretation.

Distance 41 should be about the same as distance 136a; if it is much shorter, such great extrapolation is required for locating point 42 that the method becomes undependable, and if distance 41 is much greater than 136a some of the economy of labor and materials attainable by the new method is lost. But distance 136a is unknown at the time distance 41 is laid out; I therefore use the previous critical distance, 136, as a guide, since that distance is the best available approximation of distance 136a. It will be understood that in particular cases, such as when it is desired to avoid surface improvements which might be damaged by an explosion, distance 41 may be laid out considerably greater than the distance required for greatest economy; this has the effect of moving point 44 along line 46 toward point 45, but it does not substantially impair the validity of the results.

As indicated in Fig. 3, when the second and subsequent shot points, 114a, 114b, etc., are fired, only one seismometer station nearer to the shot point than the probable critical distance is used. This is because one point, in addition to the location of the shot point, is sufficient for determining lines 127a, 127b, etc., which are very nearly straight. The resulting economy of time and labor is of considerable importance; however, it will be apparent that, if it is desired to give particular study to departures from homogeneity within layer 111, additional stations nearer to the shot point may be set up.

Another variation is to finish the profile by an actual reversal shot. That is, considering the right-hand end of Fig. 3 to designate the end of the line it is desired to survey, instead of firing a shot at the location indicated as 114c, the shot could be fired at point 40b with the seismometer stations located back along the line of survey toward the point of beginning. In this manner, point 44b would be found directly rather than deduced from an imaginary reversal.

In the prior art, the reversal lines 46, 46a, etc., had to be determined by placing actual shot points at 40, 40a, etc., which involved great additional expenditure of time, materials, and labor. But by my particular arrangement of shot points and seismometer stations, it is possible to deduce the reversal data without actually shooting the reversals. Other arrangements, random or systematic, will not furnish the required data as inexpensively.

A particularly valuable advantage of the present invention resides in the continuity of the data for the determination of the interface between layers 111 and 112. Such continuity of coverage was practically never obtained in the prior art, because the cost of obtaining it by the heretofore-known method was virtually prohibitive. A further advantage of the new method is found in the fact that the work is so arranged that the entire crew moves always in one direction. This features is always advantageous, and it is particularly important when working over a terrain where transportation is difficult.

I claim as my invention:

1. In a refraction method of seismic geophysical surveying which includes the creation of seismic pulses at a series of points and the detection of said pulses at seismometer stations spaced along the line of survey, the improvement which comprises: after the creation and recording of each seismic pulse, measuring from the "last useful seismometer station" back along the line of survey toward the point of creation of said pulse a distance not substantially less than the distance from the point of creation of said pulse to the "nearest useful seismometer station" as indicated by the records of said pulse; creating a subsequent seismic pulse at the location so determined; recording said subsequent pulse at seismometer stations placed along the line of survey in the direction away from first said point of creation of a seismic pulse; and repeating the recited operations until the line of survey is covered.

2. In a refraction method of seismic geophysical surveying which includes the creation of seismic pulses at a series of points and the detection of said pulses at seismometer stations spaced along the line of survey, the improvement which comprises: after the creation and recording of each seismic pulse, measuring from the "last useful seismometer station" back along the line of survey toward the point of creation of said pulse a distance not substantially less than the distance from the point of creation of said pulse to the "nearest useful seismometer station" as indicated by the records of said pulse; creating a subsequent seismic pulse at the location so determined; recording said subsequent pulse at seismometer stations placed along the line of survey in the direction away from first said point of creation of a seismic pulse; repeating the recited operations until the line of survey is covered; deducing from the data so obtained the travel time of a refracted seismic pulse from each "last useful seismometer station" back to the next subsequent point of creation of a seismic pulse; and further deducing from said travel time reversed profile data sufficient for resolving the indeterminateness of the unreversed data.

CHARLES HEWITT DIX.